Figure 1:
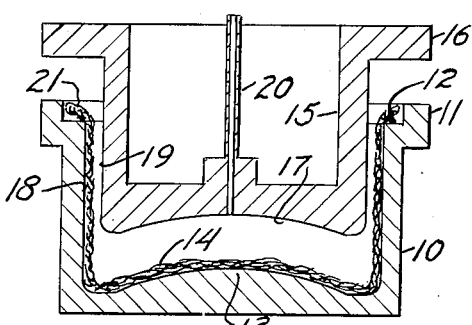

April 3, 1962     J. F. REEVES     3,028,284

MOLDING METHOD FOR PLASTIC BODIES

Original Filed Nov. 24, 1953

INVENTOR.

John F. Reeves

United States Patent Office 3,028,284
Patented Apr. 3, 1962

3,028,284
MOLDING METHOD FOR PLASTIC BODIES
John F. Reeves, Green Village, N.J.
(4162 N. Lake Drive, Milwaukee, Wis.)
Original application Nov. 24, 1953, Ser. No. 394,177. Divided and this application Apr. 30, 1959, Ser. No. 818,240
3 Claims. (Cl. 156—213)

This invention relates to methods for making plastic articles and in general, includes improvements for making plastic containers and hollow bodies whose walls include fibrous reenforcement, filler, or porous insulating material.

Rapid development in the field of plastic materials has produced certain compounds which may be introduced into appropriate molds in a liquid state and which then may be cured and hardened into a solid hard plastic material. The present invention relates to improved molding techniques for the use of such materials. The nature of the materials is not a part of this invention, and the invention is intended to include use of any type of free flowing liquid which may subsequently be hardened. As an example, there are polyester resins which are initially virtually water-thin in consistency and which may be polymerized by heat or by catalysts or additives. Other suitable resins are thermoplasts and thermo-setting types wherein heat liquifies the material or solidifies the material, respectively. No limitation is intended to be imposed in practicing the invention as to use of the types of plastics which may be adaptable to the techniques herein taught.

Containers or other bodies may be fabricated, using initially free flowing plastic liquids, which have either thick or thin walls and which walls may be augmented or reenforced by filler material of numerous sorts. Reenforcing filler material might for example be loose fibers, felted fibers, woven fabrics or other forms of known fabrics, the fibers being cotton, glass or other material. Insulating filler may be comprised of cellular blocks or preformed shapes of balsa wood, blown rubber, or blown plastics of various types, preferably wherein the cells are closed or non-porous. Insulation material and fibrous reenforcing material may be used in combination to build up a sandwich construction. In the present invention, the term "body of filler material" is intended to comprehend any suitable or desired combination of fibers, felts, fabrics, or cellular inserts which may be desired to produce a useful and suitable article, either for specialized or general utility. A particular non-limiting example of a desired fabricated article might be a container for hot or cold merchandise, wherein the container is comprised of a core of cellular insulating material embraced on the inside and outside by a mat of fibrous reenforcing material, this body of filler material being formed into a rugged structure by a bonding of plastic which impregnates the fibrous material and which bonds to the cellular material to form, in effect, an integral one-piece seamless container.

Containers of the sort herein contemplated may either be open at one or both ends or may be substantially completely closed. In the latter case, the closed type container may be fabricated by laying up a body of filler material, and impregnating same with suitable plastic material, around a core, either removable or not removable, the core defining the internal cavity of the container. The molds herein contemplated may either be removed from the finished article or may remain as a part thereof depending upon the desired final product.

Figure 2:
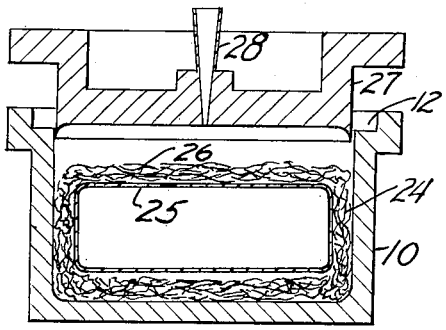
Figure 3:
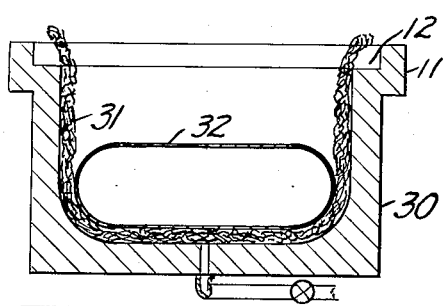
Figure 4:
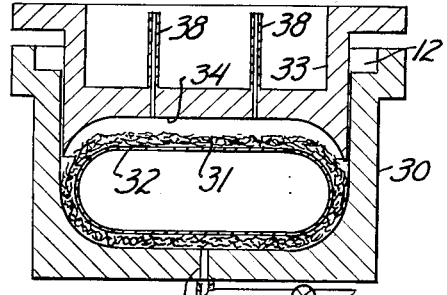
Figure 5:
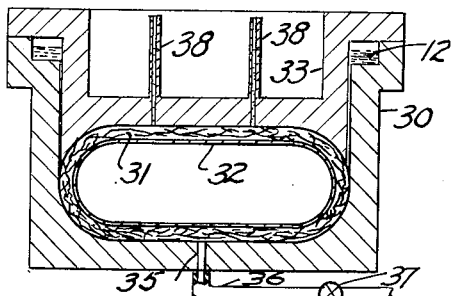

The character of the invention and the methods involved therein may be better understood by reading the following detailed description in connection with the attached drawings in which similar reference characters indicate similar parts, and in which FIG. 1 is a sectional view of a molding assembly for fabricating open containers, FIG. 2 is a sectional view of a molding assembly for fabricating closed containers, FIGS. 3, 4 and 5 are a succession of sectional views of a molding setup for fabricating a closed container, showing different steps in the procedure.

Figure 6:
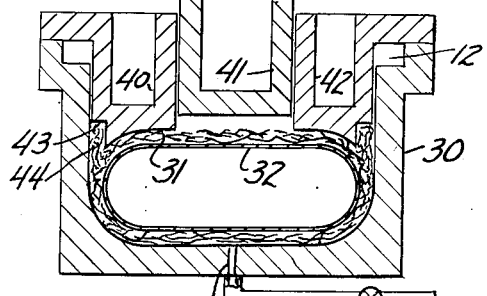
Figure 7:
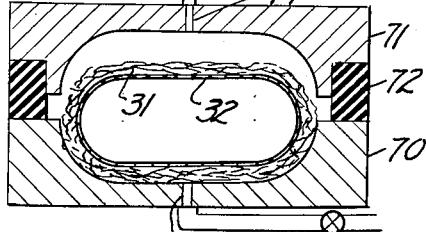

FIG. 6 is a sectional view of a mold setup of different character for forming a closed container, and FIG. 7 is a sectional view of still another setup for fabricating a closed container.

Referring to FIGURE 1, I show a lower concave mold 10 having an upper rim 11 in which is formed a trough or gutter 12. The inside of the mold 10 is formed to a shape which is desired to produce an open molded container of desired form. The bottom of the mold may be flat, or convex as shown at 13, which will produce a concave bottom in the final molded article. On the inside of the container 10, a body of filler material 14 is laid up substantially in the final configuration which is desired in the molded article. As previously noted, this body of filler material 14 may comprise layers of fabrics, loose fibers or felted fibers, and may include, if desired, either preformed or laid up panels of insulating material of substantial thickness and of cellular composition. Having laid up the filler material 14, a quantity of free flowing hardenable liquid is introduced into the mold 10 in slightly excess amount over that which is required to fabricate the finished molded article. Then, an upper mold member 14 is lowered into the mold 10 and is forced down to a level so that the bottom wall of the final container is of appropriate thickness. Preferably, a flange 16 is provided on the upper mold 15 which engages the rim 11 of the lower mold 10 so that the position of the two molds, when assembled, is precisely established.

In lowering the mold 15 into the mold 10, the lower face 17 of the upper mold engages the liquid in the lower mold and forces it up around the sides 18 and 19 of the two molds to form the side walls of the final molded article. One or more vents or risers 20 are provided in central portions of the bottom of the upper mold so that air, and then liquid, may well up into these risers, as well as around the sides of the molds, when the upper mold is forced down into the lower mold. These risers provide for the escape of air in the mold cavity and after the liquid has risen therein, provide a head of liquid on the mold cavity which will keep moderate pressure on all faces of the mold to assure complete filling and a good surface finish on the molded article. That liquid which rises around the sides of the molds wells up into the gutters 12 to provide a surplus of material to assure a full upper rim on the molded article and to allow for trimming and to flow down into the mold cavity as bubbles may rise therefrom.

In applying the filler material in the cavity of the lower mold 10, the upper edges of the filler material as at 21 may be secured adjacent the rim 12 by tacking, clamping or banding to make sure that the filler material is held in place during the molding operation and during lowering of the upper mold 15 into the lower mold 10.

In some moldings, particularly those with steep or straight sides as shown in FIG. 1, a filler material of considerable stiffness is desired to avoid displacement of the filler material during lowering of the upper mold. Such stiffness can be provided by starched fibers, or inherently stiff fibers, or other means such as stiffening binders in the filler material. Particularly where the wall of the final container is relatively thin, and where the filler material is massive or bulky, the drag on the material as the upper mold is lowered may be considerable so that some sort of treatment may be desired, such as treatments above indicated, to prevent displacement of the filler material. In some cases, it may be desirable to coat the walls of the lower mold with a tacky plastic by which the filler material may be pasted to the lower mold before the actual molding operation proceeds. Various techniques will readily occur to those skilled in the art to enable appropriate positioning and holding of the filler material.

One of the principal features of the present invention is that the filler material in the lowermost portions of the mold is not compressed by the mold parts when the hardenable liquid is introduced into the mold. Thus, the liquid may readily penetrate and permeate the filler material in the bottom of the mold under gravity conditions and without pressurization. Then, when the upper mold is finally lowered into the lower mold, the filler material in the lower part of the mold will have been thoroughly saturated. If subsequently, the lower mold compresses the filler material, the excess liquid will be driven from the filler material in the lower part of the mold without spoiling the homogeneity thereof, this liquid being forceably driven up the sides of the mold to thoroughly wet, penetrate and impregnate the filler material on the sides of the mold, driving all entrained air upwardly before it. In such impregnation, the plastic does not permeate the closed cells of cellular insulating or reenforcing components of the filler material.

The further advantage in having the layup of filler material in the lower mold in an uncompressed condition when the liquid is introduced, is that all permeable parts of the filler material and mold will be wetted by the liquid, regardless of the complexity of the mold shape. Frequently, when liquid is introduced into a fully closed mold, it will flow along the easiest paths and may leave parts of the mold and filler material wholly dry, producing an incomplete and unsatisfactory molded article.

As is well known in the art, the mold surfaces may be coated with a parting agent prior to the molding operation, so that the plastic material will not stick to the mold and so that the mold assembly may be separated and the molded article withdrawn after the plastic material has cured.

There will be times when the upper or lower mold parts are prefabricated and are to form part of the finished molded article. In such a case, parting compounds are omitted and the plastic material may be allowed to bond firmly to the mold parts.

Placement of filler material in the lower mold before introducing liquid enables effective fitting and arrangement of the material while dry; later addition of the liquid does not disturb the well-arranged material.

An alternative procedure in fabricating a molded article in the arrangement of FIG. 1 is to lay up the filler material 14 in the lower mold, introduce the upper mold 15 partway into the lower mold, and then introduce the plastic liquid into the mold through the vent 20 or other appropriate entrance opening which preferably terminates close to the bottom of the mold. This enables the liquid to permeate the uncompressed filler material in the bottom of the mold. Then, the upper mold is completely lowered to bring the bottom of the molded article to final dimensions and to force the plastic liquid up the sides of the mold in the manner previously described.

In FIGURE 2, the lower mold 10 is lined with filler material 24 and a core 25 is located within that filler material which borders the mold and which lies along the bottom of the mold. Additional filler material 26 is placed over the core 25. The upper mold 27 partly lowered into the mold 10 and free flowing hardenable liquid is introduced into the lower mold 10 in a sufficient quantity to permeate all spaces between the core 25 and the mold either before or after partial lowering of the upper mold. If the core 25 is hollow, it may be inclined to float upwardly as the liquid is introduced, the upward flotation being stopped by the partially lowered upper mold 27. Then, the upper mold 27 is lowered to its final position, locating the filler material and the core 25 in proper final relation, excess liquid flowing into the trough 12 and into one or more risers 28. Thereupon, the liquid is hardened into a hard plastic mass, forming a coating of desired thickness around the core 25 in conjunction with the filler material 24 and 26.

In FIG. 2, the riser 28 is shown as being conical or funnel shaped. This type of riser may be advantageous in taking care of a fairly large quantity of excess liquid while having only a small hole at its lower end. The hardened material of the finished article may then be parted readily from the hardened plastic material in the riser 28 and also, the hardened material in the riser 28 may easily be withdrawn from the riser on account of the taper of the riser. Where the mold parts have been coated with a parting compound, the whole finished article may easily be withdrawn from the molds. Separation of the various parts may be assisted by introduction of compressed air at suitable points to disassemble components from one another. As previously mentioned, the filler material 24 and 26 in FIG. 2 may be of any desired consistency—fibers, fabric, insulation and the like. The core 25 may either be a solid component or it may be a prefabricated hollow member of thin metal or other material. In some applications, the core 25 may comprise a hollow liner of material which is resistant to corrosion, bacteria or chemical effects, which might be introduced by the type of material which is to be stored in finished closed container structure.

FIGS. 3, 4 and 5 show a mold assembly and steps in its utilization, for fabricating a closed container structure which is covered with plastic impregnated filler material. Herein, a relatively deep lower mold 30 is provided with an upper rim 11 and an upper trough 12. A layup of filler material 31 is made on the inside of the lower mold, covering the bottom thereof, and being supported up along the sides of the mold. Then, a core or liner 32 is inserted, laying on top of part of the filler material 31. The upper portions of the filler material are then folded over the top of the core 32 as shown in FIG. 4. An upper mold 33 whose lower surface is conformed in shape to the upper part of the final porduct is then lowered into the mold 30 through only part of the available distance, so that the lower face 34 of the upper mold 33 is spaced above the filler material 31. Thereupon, hardenable free flowing liquid is introduced into the bottom of the mold cavity through a duct 35, as from a supply pipe 36 equipped with a suitable valve 37. Sufficient liquid is admitted to partially fill the mold, to penetrate through the filler material, and to rise to a level around the sides of the mold to partly cover the upper portion of the core 32 and the filler material 31. Possibly the core may float upwardly in the liquid but its upward movement is stopped by engagement of the filler material with the lower surface of the upper mold 33. Now, the liquid having penetrated throughout a large part of the mold cavity, the upper mold 33 is lowered to its final position, forcing the liquid upwardly around the edges of the upper mold and into the trough 12, and also forcing the liquid into risers 38 disposed in the upper mold, preferably at the highest points of the mold cavity. The final lowering of the upper mold presses down the core 32, if it has floated, and compacts the filler material as may be necessary to center the molded article in the mold cavity and to embrace the core 32 with a wholly solid mass of liquid and filler material. The core 32 if hollow, may be ballasted with an inert liquid such as water to suppress its tendency to float in the plastic-filled mold, and to center itself.

After filling of the mold cavity, the supply of liquid may be terminated and the plastic material is appropriately cured to produce a final covered closed container.

FIG. 5 shows the upper mold 33 in its final position and shows the probable level of plastic liquid in the mold assembly when the molding operation is substantially complete. Any entrapped air or bubbles within the mold cavity will float out to the troughs 12 and through the risers 38, but most of the entrapped air will have bled off from the molding due to the looseness of the filler material prior to lowering of the upper mold 33.

FIG. 6 shows an arrangement something like that described in connection with FIGS. 3, 4 and 5, including the lower mold 30, filler material 31 and a core 32. Particularly for large moldings, the upper mold may be made in several parts. In FIG. 6, the upper mold is shown in three parts 40, 41 and 42, parts 40 and 41 bordering the lower mold 30 and part 41 lying between the mold parts 40 and 42. In the use of this arrangement, the layup of core 32 and filler material 31 is accomplished as previously described, and mold parts 40 and 42 are brought down to their final positions to engage the filler material 31 and to hold the layup in its proper position. As shown, mold parts 40 and 42 are provided with recesses 43, accommodating filler material 44, whereby skirts are formed on the finished product for structural or decorative purposes. At this stage in processing, the mold part 41 is raised well above its final position. Then, the plastic liquid is admitted to the mold cavity as previously described so that it flows through and around the filler material, rising sufficiently to fill the entire mold cavity and occupying part of the free space between the lower face of the mold part 41 and the upper run of the filler material 31. At this point, the mold parts 40 and 42 hold the layup in its proper location and prevent its being floated upwardly. The mold part 41 may now be lowered to its final position to define its appropriate part of the surface of the final molded article. In so moving the mold part 41, the liquid wells up between the various mold parts and into risers which may be provided if desired, obviating the entrapping of any air which may remain in the filler material. A further step which may be desirable at times is to work the mold parts 40, 41 and 42 up and down with respect to each other to successively relieve pressure on the filler material, to promote the permeation of the material by liquid, and to drive out any entrapped air.

By using the arrangements of FIG. 6, very large insulated covered closed containers may be fabricated with the assurance of a perfect product.

FIG. 7 shows an arrangement which may be used in two alternative ways. A lower mold 70 having a plastic liquid entry 35, is equipped with filler material 31 and a core 32, if desired, in a fashion such as has been described. An upper mold 71 is arranged to fit over the layup 31, 32, and a resilient gasket arrangement 72 is provided to seal the upper and lower molds 70 and 71 relative to one another when the upper mold 71 is placed loosely over the molding layup. Now, liquid may be introduced into the mold cavity through a conduit 35 as previously described, and the liquid may reach a level to cover the layup 31, 32, leakage of the liquid being prevented by the seal 72. Air displaced by entry of the liquid passes from the mold cavity through a vent 74. Now, the upper mold 71 may be pressed all the way down so that its lower surfaces engage the upper surfaces of the lower mold 70, the resilient gasket 72 accommodating itself to this movement while preventing leakage of liquid from the mold cavity. When the upper and lower molds are finally engaged, surplus liquid will exude from the vent 74 and the mold cavity will be completely filled. This arrangement subscribes to one of the principal features of the invention, that the liquid is introduced into the mold cavity before the mold cavity is completely closed, which enables the liquid to penetrate fully into all portions of the mold cavity.

An alternative technique may be utilized for the arrangement of FIG. 7. When the layup 31, 32 is made and the upper mold 71 is in place, the valve 37 is turned off and the air within the mold cavity is withdrawn through the vent 74 which may be connected as by pipe 75 to a suitable suction pump or reservoir. Evacuation of the mold cavity draws the upper and lower molds 70 and 71 into contact. Now, the liquid valve 37 may be opened and liquid flows into the mold cavity, permeating all parts thereof and all ovids which exist in the filler material 31, since the entire mold cavity has been evacuated. The vacuum valve 75 may be shut off prior to introduction of liquid or may be shut off at a time when the liquid starts to vent from the opening 74 in the upper mold. This technique assures complete filling of voids in the mold cavity since all these voids will have been evacuated.

This technique differs from some which have been suggested in the prior art. The prior art suggests the sucking of liquid into a mold but does not contemplate a substantially complete evacuation of air from the mold before liquid is introduced. By the prior technique the voids in the mold cavity are not evacuated and thus, entrapped air may remain in the mold cavity while the liquid is being introduced. By my improved technique, the filling of voids in the mold cavity is assured.

The drawings and foregoing description show various mold configurations and techniques for their use. Also, cored and un-cored molded articles are proposed. It is deemed within the scope of the invention to make molded articles with cores in accordance with FIG. 1, and to make molded articles without cores in accordance with FIGS. 2-7.

The form and dimensions of molded articles are not limited in any way by the drawings and description.

In laying up filler material in the lower mold, the mold provides an assembly jig by which corners may be properly arranged with filler material, reenforcing fabric or fibers can be disposed close to outer walls of the final product to assure strength, or various types and thicknesses of filler material as well as other parts, like fittings, reenforcements, bungs or bushings, may be properly located and secured.

In the use of a core like 31, the core may extend from one end of the lower mold to the other, so the final article will constitute a tube, globe, or cylinder after the molding has been removed. If the core starts as a tube, it may be left in the molding. Or, the core whether tubular or solid, may be withdrawn. When the final product is to be a closed receptacle, the core is normally laid up in the mold with filler material covering all external surfaces of the core.

Though several embodiments of the invention are shown, it is to be understood that the invention may be applied in various forms and in various environments. Changes may be made in the arrangements shown without departing from the spirit of the invention. Reference should be had to the appended claims for definition of the limits of the invention.

What is claimed is:

1. A process for molding in a mold assembly having a lower mold forming an upwardly open cavity and having an upper mold which may be moved downwardly to a predetermined final closed position defining a molding enclosure space, said process including placing molding components including flexible compressible porous material into said cavity, moving said upper mold toward said cavity to confine said porous material, resiliently sealing and stopping said movement of the upper mold at a first position which is somewhat above final closed position to substantially avoid compression of said porous material, thereafter filling said space with a free flowing liquid plastic, allowing said plastic liquid to fill said space and impregnate said porous material, maintaining said upper mold at said first position until said filling has been substantially completed, and then moving said upper mold to a second position which is final closed position where said space is reduced in volume and simultaneously venting air and surplus liquid plastic, and allowing said plastic to harden.

2. A process for molding in a mold assembly having a lower mold forming an upwardly open cavity and having an upper mold which may be moved downwardly to a predetermined final closed position defining a molding enclosure space, said process including placing molding components including flexible compressible porous material into said cavity, moving said upper mold toward said cavity to confine said porous material, resiliently sealing and stopping said movement of the upper mold at a first position which is somewhat above final closed position to substantially avoid compression of said porous material, thereafter filling said space with a free flowing liquid plastic, allowing said plastic liquid to fill said space and impregnate said porous material, maintaining said upper mold at said first position until said filling has been substantially completed, and then moving said upper mold to a second position which is final closed position where said space is reduced in volume sufficiently to compress said porous material and simultaneously venting air and surplus liquid plastic, and allowing said plastic to harden.

3. A process for molding in a mold assembly having a lower mold forming an upwardly opening cavity and having a movable upper mold which may be inserted and moved downwardly to a predetermined final closed position, said upper mold having a concave lower portion to coact with the cavity of the lower mold in said final position, said process including placing flexible compressible porous material into said cavity of the lower mold, placing a core element in said cavity on said porous material, draping flexible compressible porous material on top of said core element, moving said upper mold toward said core element with its concave bottom cooperating in shape with the top of said draped core to provide a molding enclosure space, resiliently sealing and stopping said movement of the upper mold at a first position which is somewhat above final closed position to substantially avoid compression of said porous material, thereafter filling said molding space with a free flowing liquid plastic, allowing said plastic material to fill said space and flow through said filler material to be on both sides thereof, maintaining said upper mold at said first position until said filling has been substantially completed, then moving said upper mold to a second position which is a final closed position where said molding space is reduced in volume, and allowing said plastic to harden.

References Cited in the file of this patent

UNITED STATES PATENTS

| | | |
|---|---|---|
| 1,295,230 | Stevenson | Feb. 25, 1919 |
| 2,495,640 | Muskat | Jan. 24, 1950 |